United States Patent
Simmons

(10) Patent No.: US 11,542,420 B2
(45) Date of Patent: Jan. 3, 2023

(54) OIL SPILL SORBENT

(71) Applicant: Carbontec Energy Corporation, Bismarck, ND (US)

(72) Inventor: John J. Simmons, Mandan, ND (US)

(73) Assignee: Carbontec Energy Corporation, Bismarck, ND (US)

( * ) Notice: Subject to any disclaimer, the term of this patent is extended or adjusted under 35 U.S.C. 154(b) by 144 days.

(21) Appl. No.: 17/181,291

(22) Filed: Feb. 22, 2021

(65) Prior Publication Data
US 2021/0301187 A1    Sep. 30, 2021

Related U.S. Application Data

(60) Provisional application No. 63/000,622, filed on Mar. 27, 2020.

(51) Int. Cl.
| | |
|---|---|
| *C09K 3/32* | (2006.01) |
| *B01J 20/24* | (2006.01) |
| *B01J 20/06* | (2006.01) |
| *B01J 20/30* | (2006.01) |
| *B01J 20/32* | (2006.01) |
| *B01J 20/28* | (2006.01) |

(52) U.S. Cl.
CPC .............. *C09K 3/32* (2013.01); *B01J 20/06* (2013.01); *B01J 20/24* (2013.01); *B01J 20/28009* (2013.01); *B01J 20/3021* (2013.01); *B01J 20/3212* (2013.01); *B01J 20/3236* (2013.01); *B01J 20/3287* (2013.01)

(58) Field of Classification Search
CPC ... C09K 3/32; B01J 20/06; B01J 20/24; B01J 20/28009; B01J 20/3021; B01J 20/3212; B01J 20/3236; B01J 20/3287
USPC .......................................................... 502/404
See application file for complete search history.

(56) References Cited

U.S. PATENT DOCUMENTS 4,959,154 A    9/1990  Simmons

*Primary Examiner* — Edward M Johnson
(74) *Attorney, Agent, or Firm* — DeWitt LLP

(57) ABSTRACT

A method of treating wood chips to be used as a media for ameliorating oil spills on land or water involves heating in a mixture of petroleum wax and vegetable oil to remove moisture content and open the pores of the wood chip to allow the oil/wax blend to penetrate into the interior of the wood chips and subsequently grinding up the chips to a predetermined mesh size. The ground chips impregnated with wax/oil are then blended with magnetic iron ore concentrate and packaged/bagged for later distribution on an oil slick. The magnetic iron ore concentrate clings to the ground, oil/wax coated wood chips and facilitates retrieving the ground chips that have absorbed the spilled oil using a magnetic pick-up.

4 Claims, 1 Drawing Sheet

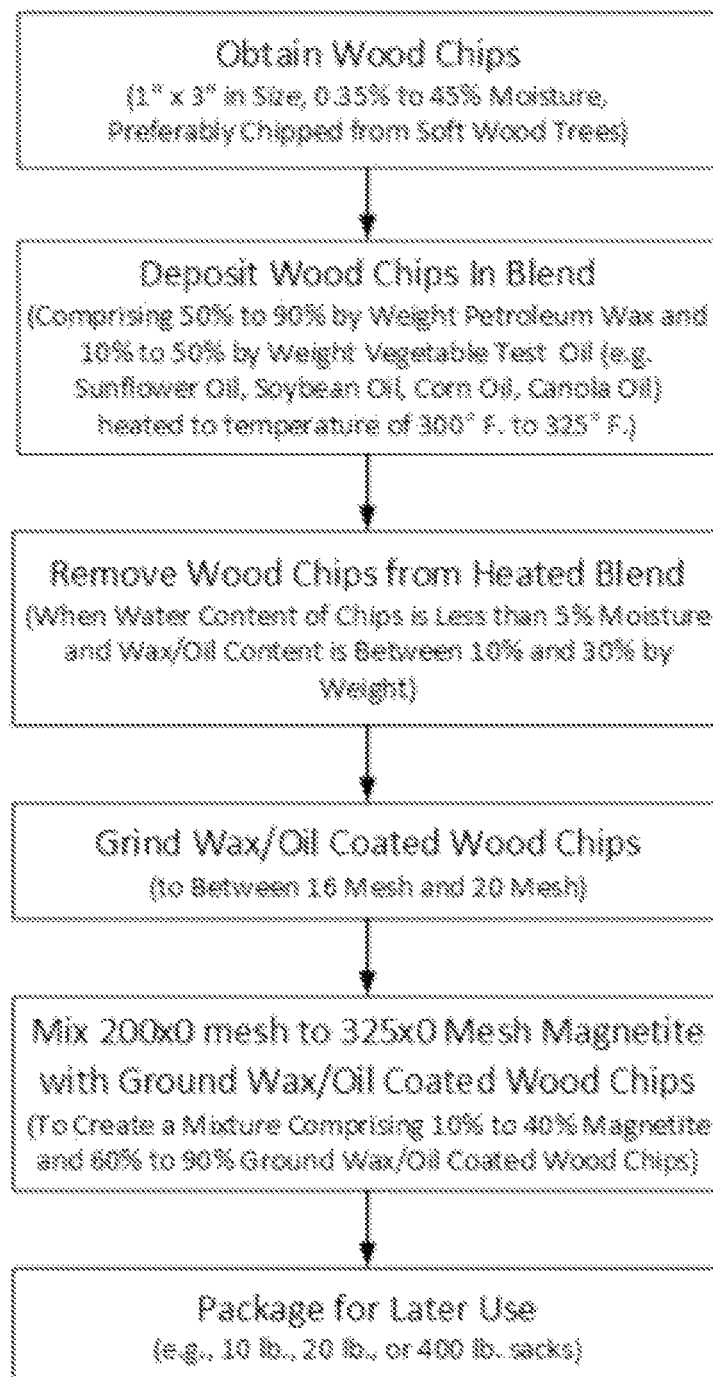

OIL SPILL SORBENT

CROSS-REFERENCED TO RELATED APPLICATIONS

This application is a non-provisional application of Application No. 63/000,622, filed Mar. 27, 2020, and claims priority from that application which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates generally to oil spill remediation and, more particularly, to a method of producing a low cost sorbent which, when spread onto an oil spill, either on land or on water, serves to adsorb and absorb the spilled oil and that can be more readily retrieved for disposal.

II. Discussion of the Prior Art

In my earlier U.S. Pat. No. 4,959,154, there is described a method of producing a wood chip-based sorbent for use in oil spill cleanup wherein the wood chips are pretreated in a moisture drying operation in which wood chips, varying in sizes ranging from ⅜ to 2 inches in width and length and ¼ inch in thickness, were dried in hot oil or hot wax in a temperature range of 250° to 350° F. for a time depending on the chip size, but typically between 3 minutes to 12 minutes. So that the dried chips would be non-toxic, the oil used in the drying step was preferably a mixture of sunflower oil, corn oil and soybean oil. The resulting product could be bagged or stored for later use over prolonged periods. The 4,959,154 patent also indicated that heated 100% food grade paraffin wax could be utilized in the drying operation.

At the time of use, the sorbent would be spread over the spilled oil slick, whereupon the spilled oil would be absorbed and adsorbed by the treated chips. The chips would then be retrieved from a body of water by a screen device or by a suction pump and could be burned as a fuel.

Experiments conducted using the sorbent produced in accordance with the '154 patent showed only a 3:1 captured oil ratio, i.e., 3 pounds sorbent was required to recover 1 pound of spilled oil or 18 pounds sorbent recovered 1 gallon of oil.

SUMMARY OF THE INVENTION

In accordance with the present invention, wood chips about 1 inch by 3 inches in size are produced by chipping hardwood trees, such as maple or oak, but preferably chipping soft wood trees such as pine, cedar or spruce and whose moisture content is typically in a 35-45% range. The chips are then dried in a blend of 50-90% by weight of petroleum wax and 50-10% by weight of a vegetable oil that has been heated to a temperature of 275°–345° F., and preferably, 325° F. Once the water content of the chips is less than about 5% and the wax/oil content is between 10% and 30% by weight, the wood chips are removed from the heated wax/vegetable oil. The heated chips are allowed to cool to room temperature.

Next, the treated wood chips are ground to a 16-20 mesh size and the particles are homogenously blended with a 200-325 mesh, more preferably, a 325 mesh magnetite iron ore concentrate at a rate of 10% to 40% by weight magnetite and 90% to 60% by weight of oil/wax coated wood chips before being packaged for later use in treating an oil spill.

The addition of the magnetite facilitates later recovery of the mixture from a spill on either water or soil in that either a barge fitted with a magnetic pickup conveyor or a crane with a magnetic pickup unit can be used to retrieve the oil coated sorbent for disposal.

DESCRIPTION OF THE DRAWINGS

The features, objects and advantages of the invention are obtained by following the steps laid out in the flow chart of FIG. 1 showing the process employed in producing an improved sorbent for remediating an oil spill.

DESCRIPTION OF THE PREFERRED EMBODIMENT

The above Summary of the Invention and the process flow chart of FIG. 1 sets out the steps used in preparing an oil-spill treating sorbent that is substantially more effective in terms of oil recovery per unit weight of sorbent than afforded by the prior art method described in the '154 patent.

The afore-referenced patent describes the processing of standard 1 inch by 3 inch wood chips in a blend of hot wax and vegetable oils. Tests at that time showed that wood chips of that size were necessary to allow for good distribution of the oil sorbent on an oil spill, especially from an aircraft or during windy conditions. It was not obvious that a finely ground product would be effective.

However, later tests which were conducted showed that finely ground wood chip particles could be much more effective than the coarser material, due to the increased surface area provided for exposure to the oil spill, and processing the wood chips for a longer period in the hot solution blend, provided a product that had a greater degree of wax/oil penetration, so that when the material was ground to a finer size, the individual particles had a satisfactory and effective coating of wax and oil.

The removal rate of oil from an oil spill was dramatic, increasing from the requirement of 3 pounds of sorbent to absorb 1 pound of oil as with the prior art to 1 pound of sorbent absorbing 3 pounds of oil, or on a different scale, from 756 pounds of sorbent required to capture 1 barrel of oil with the prior art material to 84 pounds of sorbent to capture 1 barrel of oil with sorbent prepared as described herein.

An oil spill on land is more difficult to recover. The current practice is to excavate the entire amount of oil contaminated soil plus the surrounding soil and the soil beneath the spill. The use of a magnetic oil sorbent allows for the recovery of a high percentage of the oil contaminated soil without the requirement to over excavate the soil in the area. Testing revealed that increasing the amount of magnetite from 20-30%, for use on water spills to 40-50% provided for a higher oil recovery on land-based oil spills.

When it is considered that the finely ground wood particles that contain a wax/vegetable coating are an excellent host for oil consuming microbes, another feature of the invention may comprise the addition of such microbes along with a microbe nutrient to the mix just prior to application of the sorbent to an oil spill. If added too early, the microbes will begin to consume the oil impregnated into the wood chips.

Such microbes and associated nutrients are commercially available. One such source is Acorn Biotechnical of Hemstead, Tex., which offers ENSPOR crystals for petroleum remediation. The microbe containing magnetic oil sorbent is especially useful in addressing land-based oil spills and oil spills from lakes and oceans that invade marshlands, especially those that are not accessible. The oil sorbent with microbes attached can be broadcast on the oil spill in the marshland. Here, the oil sorbent attracts the oil of the spill which then is consumed by the microbes.

In use for land-based oil spills, it is found expedient to leave behind a layer of fresh sorbent allowing the microbes to consume any residual oil after the soil has been initially treated.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A method for producing a sorbent for use in ameliorating oil spills comprising the steps of:
   (a) obtaining a batch of wood chips of a predetermined size from one of hardwood or soft wood trees and preferably from soft wood trees;
   (b) creating a mixture blend of 50% to 90% by weight of petroleum wax and 50% to 10% by weight of vegetable oils selected from a group consisting of sunflower oil, soybean oil, corn oil, canola oil and palm oil;
   (c) immersing the wood chips in the mixture blend of step (b) and heating the blend to a temperature above 275° and preferably in a range of from 300° F. to 325° F.;
   (d) removing the wood chips from the mixture blend once a water content of the wood chips is less than 5% moisture and a wax/oil content of the wood chips is in a range between 10% and 30% by weight;
   (e) grinding the wax/oil coated wood chips to 16 to 20 mesh;
   (f) adding a predetermined magnetic iron ore concentrate of a predetermined mesh size in a predetermined proportion by weight to the wax/oil coated and ground wax/oil coated wood chips; and
   (g) package the mixture of step (f) for later shipment and application.

2. The method of claim 1 wherein the predetermined quantity of magnetic iron ore concentrate is in a range between 10% and 40% by weight to between 90% and 60% by weight of the ground wax/oil coated wood chips.

3. The method of claim 2 wherein the predetermined mesh size of the magnetic iron ore concentrate is between 200 mesh and 325 mesh with 325 mesh being preferred.

4. The method of claim 1 and further including a step of introducing a microbial additive and microbe nutrient to the mixture of step (f) at the time of application of the sorbent to an oil spill.

* * * * *